United States Patent [19]

Ohmae

[11] Patent Number: 5,576,870
[45] Date of Patent: Nov. 19, 1996

[54] LIQUID CRYSTAL DISPLAY PANEL HAVING A PHASE GRATING FORMED OF LIQUID CRYSTAL MOLECULES

[75] Inventor: Hideki Ohmae, Suita, Japan

[73] Assignee: Matsushita Electric Industrial Co., Ltd., Osaka, Japan

[21] Appl. No.: 230,823

[22] Filed: Apr. 21, 1994

[30] Foreign Application Priority Data

Apr. 23, 1993 [JP] Japan ................................ 5-097588

[51] Int. Cl.$^6$ ................................................. G02F 1/13
[52] U.S. Cl. ................................................. 359/95
[58] Field of Search ................................ 359/76, 75, 95

[56] References Cited

U.S. PATENT DOCUMENTS

| | | | |
|---|---|---|---|
| 3,967,883 | 7/1976 | Meyerhofer et al. | 359/76 |
| 4,389,096 | 6/1983 | Hori et al. | 350/339 R |
| 4,496,220 | 1/1985 | Goscianski | 359/76 |
| 4,878,742 | 11/1989 | Ohkubo et al. | 359/75 |
| 5,231,432 | 7/1993 | Glenn | 359/40 |
| 5,299,037 | 3/1994 | Sakata | 359/95 |
| 5,299,289 | 3/1994 | Omae et al. | 359/94 |

FOREIGN PATENT DOCUMENTS 58-33215  2/1983  Japan ........................... 359/76

Primary Examiner—William L. Sikes
Assistant Examiner—Charles Miller
Attorney, Agent, or Firm—Wenderoth, Lind & Ponack

[57] ABSTRACT

A liquid crystal display panel includes a first substrate and a second substrate, at least one of which possesses light transmissivity, each having an electrode layer formed thereon, the electrode layers confronting each other, and a liquid crystal layer sandwiched between the first substrate and the second substrate, divided into plural regions, and including liquid crystal molecules. The liquid crystal molecules are oriented in the same direction in each of first regions, and in a different direction in second regions each located between two adjacent first regions. The second regions are spaced at a regular periodicity. Without an electric field applied to the liquid crystal layer, the different orientations of the liquid crystal molecules create differences in the refractive indices at which the light is transmitted so as to serve as a phase grating the diffracts incident light. When an electric field is applied, the difference in the refractive indices decreases, and the incident light is not diffracted but propagates as is through the panel. The liquid crystal display panel may be incorporated into a projection display apparatus having a light source and projection lens.

24 Claims, 12 Drawing Sheets

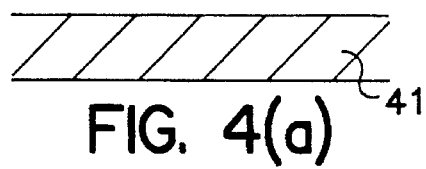
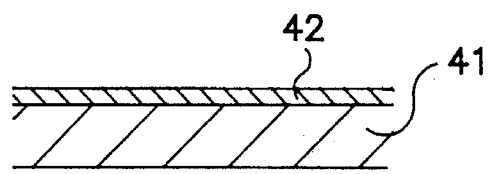
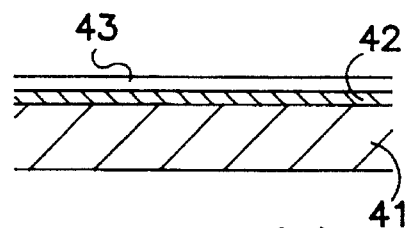
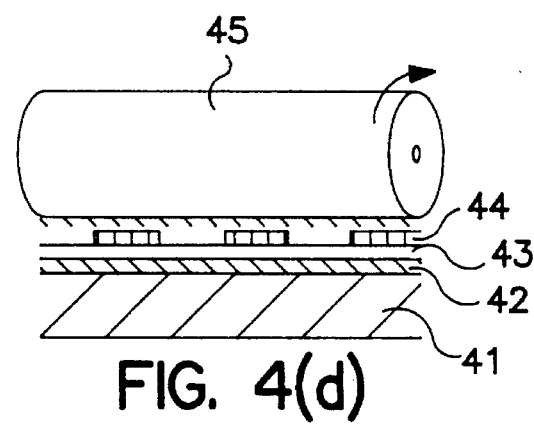
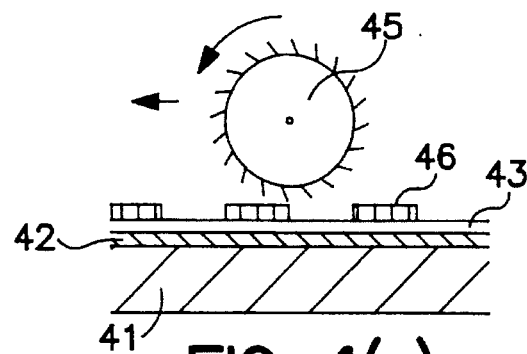
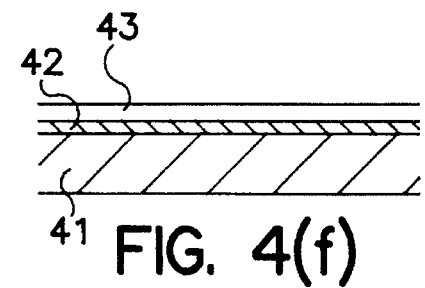
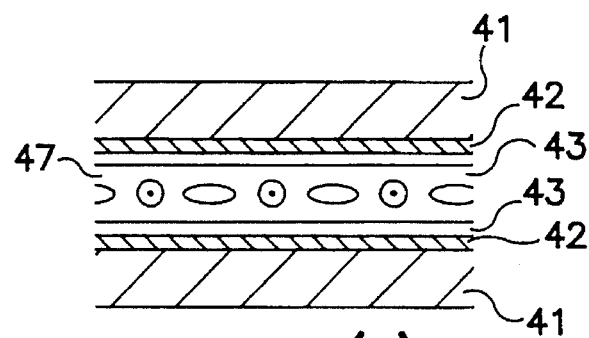

LIQUID CRYSTAL DISPLAY PANEL HAVING A PHASE GRATING FORMED OF LIQUID CRYSTAL MOLECULES

BACKGROUND OF THE INVENTION

1. Field of the Invention

The present invention relates to a liquid crystal display panel for forming an optical image by changing the diffraction of light, its method of manufacture, and a projection display apparatus for magnifying the optical image displayed on the liquid crystal display panel and projecting the image onto a screen.

2. Description of the Prior Art

A large screen display is recently attracting attention, such for use as a home theater and for use in making a presentation. Many projection apparatus using light valve have been proposed. Lately, liquid crystal projection apparatus for displaying an image on a wide screen using a small liquid crystal display panel and a projection lens or the like, have been developed.

The liquid crystal display panel is designed to create a display image mainly by varying its optical characteristic electrically, and is classified based on many kinds of operating principles. A twisted nematic (TN) liquid crystal display panel used in existing liquid crystal projection apparatus makes use of an electric field to change the polarization of the liquid crystal. The TN liquid crystal display panel, however, requires a polarizer for modulating the light, and hence the efficiency is poor.

Known methods of controlling the light without using a polarizer include methods based on using the scattering or diffraction of light. Liquid crystal display panels for forming an optical image by varying the state in which light is scattered include phase change (PC), dynamic scattering mode (DSM), and polymer dispersion liquid crystal panels. In particular, the polymer dispersion liquid crystal panel has been under intensive consideration recently. Such a panel is disclosed, for example, in U.S. Pat. No. 4,435,047. However, in a liquid crystal projection apparatus using this polymer dispersion liquid crystal panel there is a compromise between the image brightness and contrast (Tomita, Proc. of SID, p. 579, 1992), and such an apparatus capable of forming an image having both satisfactory brightness and contrast has not yet been realized.

On the other hand, a liquid crystal display panel for forming an optical image by changing the state under which light is diffracted is disclosed in U.S. Pat. No. 4,729,640. The basic structure and operation of this type of liquid crystal display panel are shown in FIGS. 13(a) and 13(b). Transparent electrodes 135 and 136 are formed on glass substrates 131 and 132, and an irregular sectional layer 134 is formed on a surface of at least one of the glass substrates confronting a liquid crystal layer 133. The irregular sectional layer 134 has a periodic configuration, and the refractive index of the irregular sectional layer 134 is nearly equal to the ordinary refractive index no of a liquid crystal 137. FIG. 13(a) shows a case in which an electric field is not applied to the liquid crystal layer 133, and the liquid crystal 137 is oriented in a homogeneous state with its molecular long axis parallel to the longitudinal direction of the stripes of the irregular sectional layer 134. A ray of light 138 entering this liquid crystal panel is transmitted with a refractive index of $n_o$ in the convex portion of the irregular sectional layer 134. However, a polarized component 138a of the light is transmitted in the concave portion of irregular sectional layer, i.e. in the liquid crystal, with an extraordinary refractive index of $n_c$. Thus the irregular sectional layer acts as a phase grating, and the ray of light 138 is modulated. On the other hand, FIG. 13(b) shows a case in which a sufficiently large electric field is applied to the liquid crystal layer 133 so that the liquid crystal layer 137, having a positive dielectric anisotropy, is oriented in a direction normal to the glass substrates 131, 132. Accordingly, the light is transmitted in the concave portion, i.e. in the liquid crystal 137, with an ordinary refractive index $n_o$ which is the same as the refractive index of the convex portion. Accordingly, the incident ray of light 138 is not diffracted but propagates straight through the panel.

An example of a projection display apparatus using the diffraction type of liquid crystal display panel of FIG. 13 is shown in FIG. 14. The light emitted from a lamp 141 is converted by a concave mirror 142, passes through a polarizer 145, and enters a liquid crystal display panel 143. Natural light emitted from the lamp 141 is half-absorbed by the polarizer 145, and the polarized light enters the liquid crystal display panel 143. The light entering the liquid crystal panel 143, if not modulated, is completely led into a projection lens 144. A matrix pixel electrode and a grating are provided on one side of the liquid crystal layer 133 of the liquid crystal panel 143. An optical image can be formed on the liquid crystal panel 143 by changing the state of diffraction of the light with video signals. The light transmitted from a pixel to which a sufficient voltage is applied completely enters the projection lens 144 and reaches a screen 148, and a bright spot is displayed at a corresponding position on the screen 148. Diffracted light is emitted from the pixels across which no voltage is applied. The diffracted light is transmitted from the projection lens 144 and does not reach the screen 148, and a dark spot is displayed at a corresponding position on the screen 148.

Problems of the conventional diffraction type of liquid crystal panel are discussed below. While the liquid crystal display panel is in the "diffraction state" the polarized component 138a of the light 138, oscillating in a direction perpendicular to the sheet of FIG. 13, is transmitted through the liquid crystal with the extraordinary refractive index $n_e$, and the ray of light is diffracted and modulated. However, a polarized component 138b of the light 138, oscillating in a direction parallel to the sheet of paper, passes through the liquid crystal with an ordinary refractive index $n_o$. Hence, the ray of light is not modulated. That is, only 50% of the incident ray of light is diffracted and modulated, while the remaining 50% of the ray of light directly passes through the panel. Therefore, in the projection type display apparatus shown in FIG. 14, the polarized 145 is used to transmit only polarized light capable of being diffracted and modulated by the liquid crystal panel 143. Hence, the efficiency of light utilization is 50%.

To solve this problem, a diffraction type of liquid crystal display panel has been proposed in U.S. Pat. No. 4,251,137. In this panel, gratings are formed on upper and lower substrates, respectively, and are oriented orthogonally. U.S. Pat. No. 4,856,869 similarly discloses an apparatus in which two diffraction liquid crystal display panels are arranged so that the gratings of the respective panels are orthogonal.

However, each grating in these panels must have an approximate height of several microns, and a period of about several microns to about 20 microns. It is extremely difficult to form the gratings uniformly over the entire display area.

Further, if the grating is formed of a substance having a dielectric constant different from that of the liquid crystal, when a sufficient electric field is applied between upper and lower electrodes, the direction of electric lines of force is inclined toward that element having the lower dielectric constant. Accordingly, the liquid crystal aligns in the direction of the electric line of force, whereupon the refractive index of the liquid crystal does not match the grating.

Moreover, if the refractive indices of the liquid crystal and the grating are matched for a certain wavelength of light, light of another wavelength may be transmitted through the liquid crystal and grating with different refractive indices. In this case, the light may be diffracted.

Similarly, if the refractive indices of the liquid crystal and grating are matched at a certain temperature, light may be transmitted with different refractive indices due to temperature changes, thereby causing diffraction.

SUMMARY OF THE INVENTION

It is hence a primary object of the invention to provide a liquid crystal panel which utilizes with high efficiency and forms an optical image of high contrast, and to provide a projection type display apparatus using such a liquid crystal panel.

To achieve the object, the liquid crystal display panel comprises a first substrate and a second substrate, at least one of which possesses light transmissivity, and each which have electrode layer formed thereon, the electrode layers confronting each other, and a liquid crystal layer sandwiched between the first substrate and the second substrate, divided into plural regions, and including liquid crystal molecules, wherein the liquid crystal molecules are oriented in the same direction in each of first regions and in a different direction in each of second regions each defined between two adjacent first regions, the regions being formed with a regular periodicity.

In particular, the liquid crystal molecules in the second regions are preferably oriented in a direction extending at 90° to the direction in which the molecules are oriented in the first regions. This is to provide the greatest difference in refractive indices throughout the phase, while allowing the thickness of the liquid crystal layer to be minimal.

The projection display apparatus of the invention comprises the liquid crystal display panel, light generating means for generating light, a first optical element for leading the light to the liquid crystal display panel, and a second optical element part for projecting the light modulated by the liquid crystal display panel.

In the liquid crystal display panel for forming an optical image, since the phase grating having a non-uniform refractive index is formed of liquid crystal molecules, light can be modulated without concern for polarization of the incident light. Therefore, the liquid crystal display panel utilizes light with high efficiency. Further, the present invention is free from effects of refractive index changes due to wavelength of incident light, incident angle or temperature. Accordingly, a liquid crystal display panel capable of displaying a quality image having excellent contrast can be realized. It is not necessary to form a separate grating, and hence the liquid crystal display panel can be manufactured easily and inexpensively. By using this liquid crystal panel, a projection display apparatus capable of displaying a bright image with a high degree of contrast image can be realized.

BRIEF DESCRIPTION OF THE DRAWINGS

FIGS. 4(a)–4(g) illustrate a method of manufacturing the liquid crystal display panel of the present invention.

DESCRIPTION OF THE PREFERRED EMBODIMENTS

The liquid crystal display panel of the invention controls the diffraction state with an electric field, and acts as a grating capable of modulating light. The principle behind the operation of a diffraction type of liquid crystal display panel of the invention is shown in FIGS. 12(a) and 12(b).

A liquid crystal layer 123 is sandwiched between two transparent substrates 121, 122. Transparent electrodes 124, 125 are formed on the sides of the liquid crystal layer 123 confronting the two transparent substrates 121, 122. Natural light 126 enters from an input side of the liquid crystal display panel.

Figure 12A:
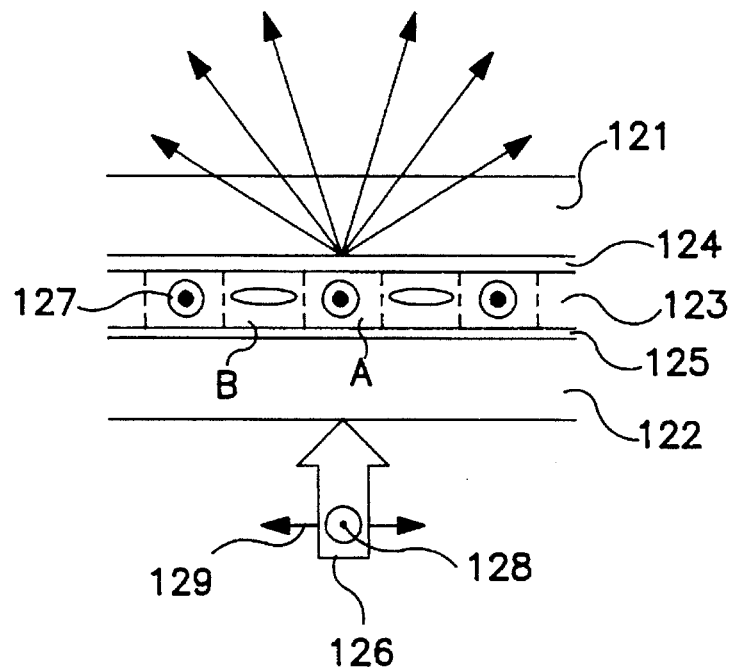
FIGS. 12(a) and 12(b) are schematic diagrams of a model of a diffraction type of liquid crystal display panel of the invention.
Figure 12B:
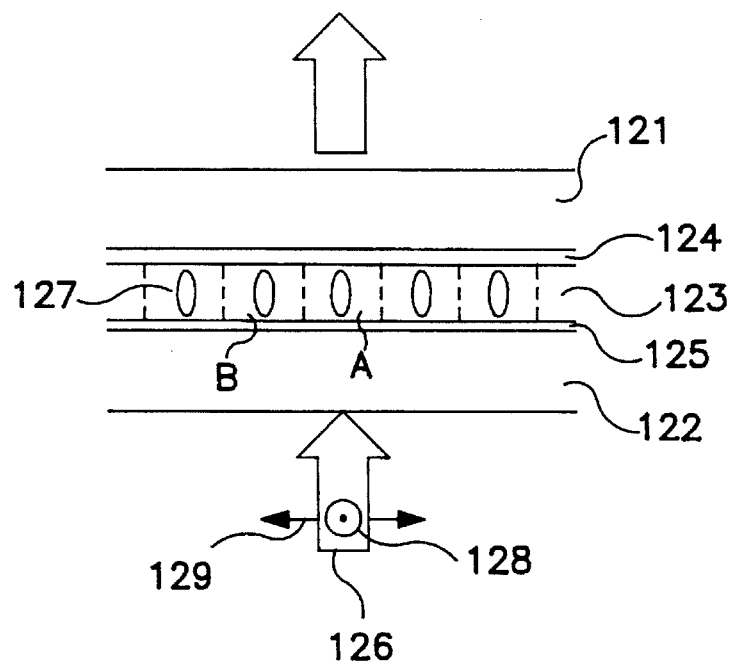
Figure 13A:
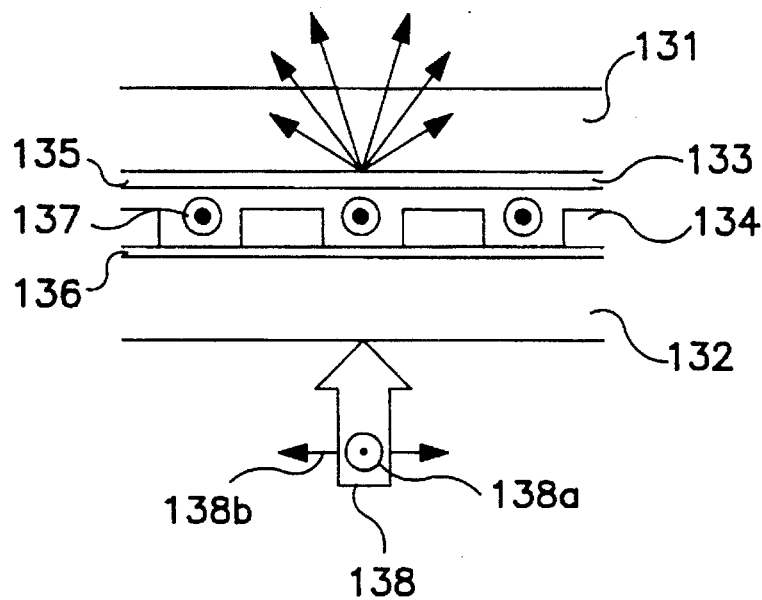
FIGS. 13(a) and 13(b) are similar diagrams of a prior art diffraction type of liquid crystal display panel.
Figure 13B:
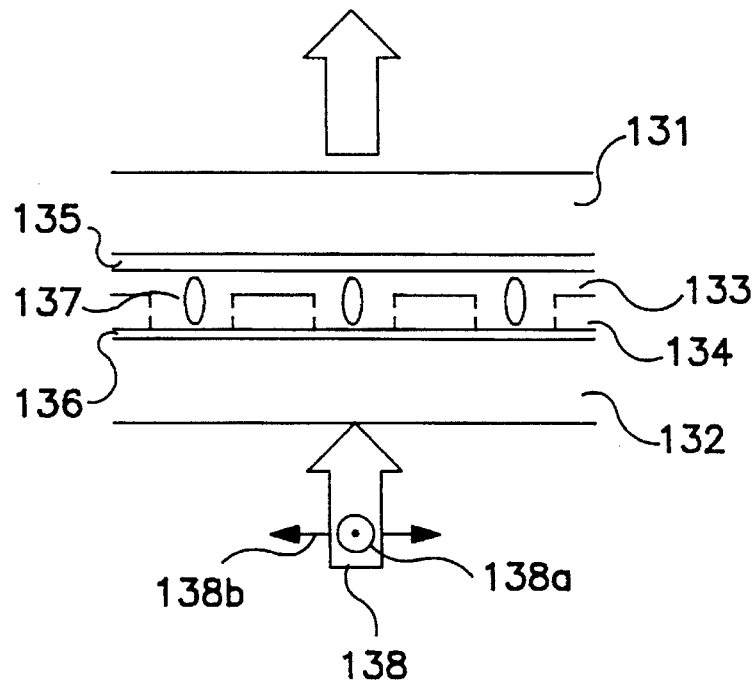
Figure 14:
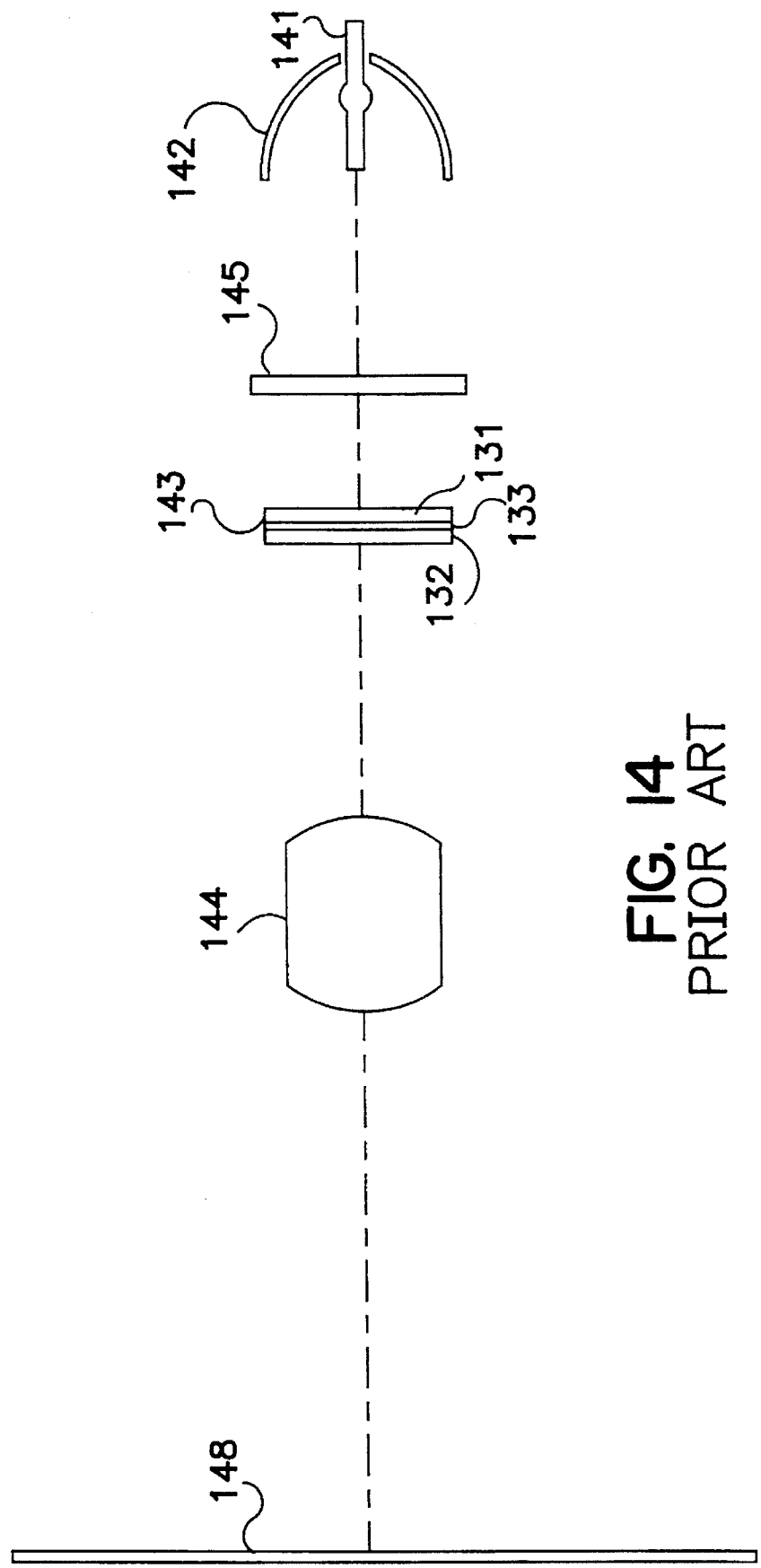
FIG. 14 is a schematic diagram of a conventional projection display apparatus.

FIG. 12(a) shows the state in which an electric field is not applied to the liquid crystal panel. In this state, the direction of orientation of liquid crystal molecules 127 of the liquid crystal layer 123 in the panel is homogeneous, and the liquid crystals in the portions A of the layer are oriented with their molecular long axes perpendicular to the sheet of paper. The portions A and the portions B, in which the directions of orientation of the liquid crystal molecules differ, are striped as viewed in a direction perpendicular to the substrate, and are disposed alternately at equal intervals. The liquid crystal panel in this state acts as a phase grating since the portions A and B have different refractive indices which periodically repeat. Supposing the difference in the refractive indices of mutually adjacent portions A and B to be an, the wavelength of natural light to be λ, and the thickness of the liquid crystal layer 123 to be t, the diffraction efficiency η of transmitted diffracted light of the 0-th order, that is, the transmissivity of straight light is approximately expressed as $$\eta o = 0.5 \times (1 + \cos\delta)$$

$$(\text{where } \delta = 4\pi \Delta n \, d/\lambda) \quad (1)$$

The natural light 126 entering the liquid crystal display panel is divided into polarized light 128 oscillating in a direction perpendicular to the sheet of paper, and polarized light 129 oscillating in a direction parallel to the sheet of paper. The polarized light 128 oscillating in a direction perpendicular to the sheet of paper passes through the portion A of the liquid crystal layer with an extraordinary refractive index $n_o$, and passes through portion B of the liquid crystal layer with an ordinary refractive index $n_o$. The polarized light 129 oscillating in a direction parallel to the sheet of paper passes the portion A with an ordinary refractive index no, and passes through the portion B with an extraordinary refractive index $n_e$. Both the polarized light 128 and 129 experience a refractive index difference an $\Delta n = n_e - n_o$, and therefore the natural light 126 is transmitted by diffracting at the efficiency expressed in formula (1) wherein the refractive index difference $\Delta n = n_e - n_o$.

On the other hand, when an electric field is applied to the liquid crystal panel, as shown in FIG. 12(b), the direction of orientation of the liquid crystal molecules 127 changes to a homeotropic state. When an electric field is applied to the liquid crystal having a positive dielectric anisotropy, the long axes of the liquid crystal molecules align in the direction of the electric field, that is, in a direction perpendicular to the substrate. As a result, the liquid crystal state the same throughout the portions A and B of the liquid crystal layer 123, and refractive indices of the portions A, B of the ordinary refractive index $n_o$ are always experienced by both the polarized light 128 oscillating in a direction perpendicular to the sheet of paper and the polarized light 129 oscillating in a direction parallel to the sheet of paper. Hence the refractive index difference an $\Delta n = n_o - n_o = 0$, and the diffraction efficiency of light of the 0-th order is 1 from equation (1). That is, diffraction does not occur, and the incident light is emitted as it is.

When the panel is in a diffraction state, the angle of diffracted light is expressed as follows.

$$\sin\theta = m\lambda/(n\,p) \quad (2)$$

where m is the diffraction order, λ is the wavelength of light, n is the refractive index of the transparent substrate 122, and P is period of the grating.

So far, only a crystal layer in which the direction of orientation of the liquid crystal molecules of the portion B of the layer extends at an angle of 90° to the direction of orientation of liquid crystal molecules of the portion A has been described. Supposing that this angle is θ, the ray of light 128 oscillating in a direction perpendicular to the sheet of paper passes through the portion A of the liquid crystal layer with an extraordinary refractive index $n_e$, and the ray of light 129 oscillating in a direction parallel to the sheet of paper passes through the portion B of the liquid crystal layer with an ordinary refractive index $n_o$, as has already been mentioned above. In the portion B of the liquid crystal layer, however, the refractive index n, experienced by the ray of light 128 oscillating in a direction perpendicular to the sheet of paper is $$n_s = \frac{n_e n_o}{\sqrt{n_e^2 \sin\theta + n_o^2 \cos\theta}} \quad (3)$$

and the refractive index $n_p$ experienced by the polarized light 129 oscillating in a direction parallel to the sheet of paper is $$n_p = \frac{n_e n_o}{\sqrt{n_o^2 \sin\theta + n_e^2 \cos\theta}} \quad (4)$$

When the difference between refractive indices n, and $n_e$ and the difference between the refractive indices $n_p$ and $n_o$ are placed in the formula (1) an efficiency, by which each light is diffracted, is obtained. When an electric field is applied, the efficiency can be determined in exactly the same manner, and hence an explanation thereof is omitted.

Preferred embodiments of the invention will now be described below while referring to the drawings.

Figure 1A:
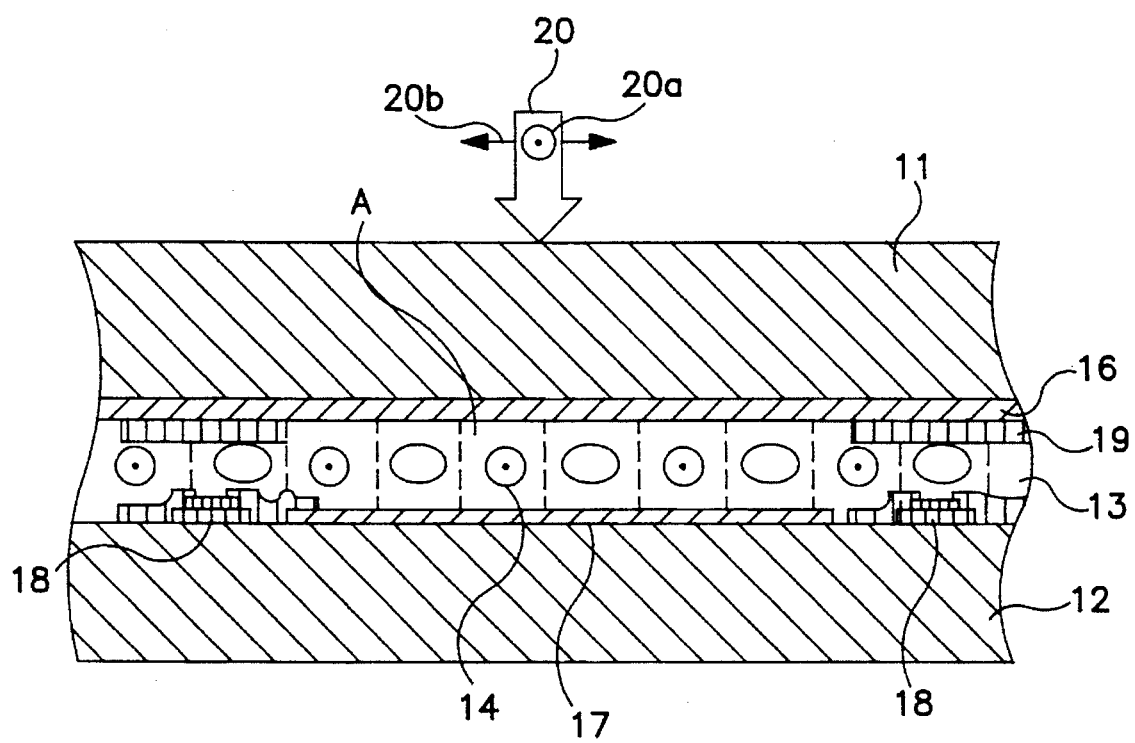
FIG. 1(a) is a sectional view of part of a first embodiment of a liquid crystal display panel according to the present invention.
Figure 1B:
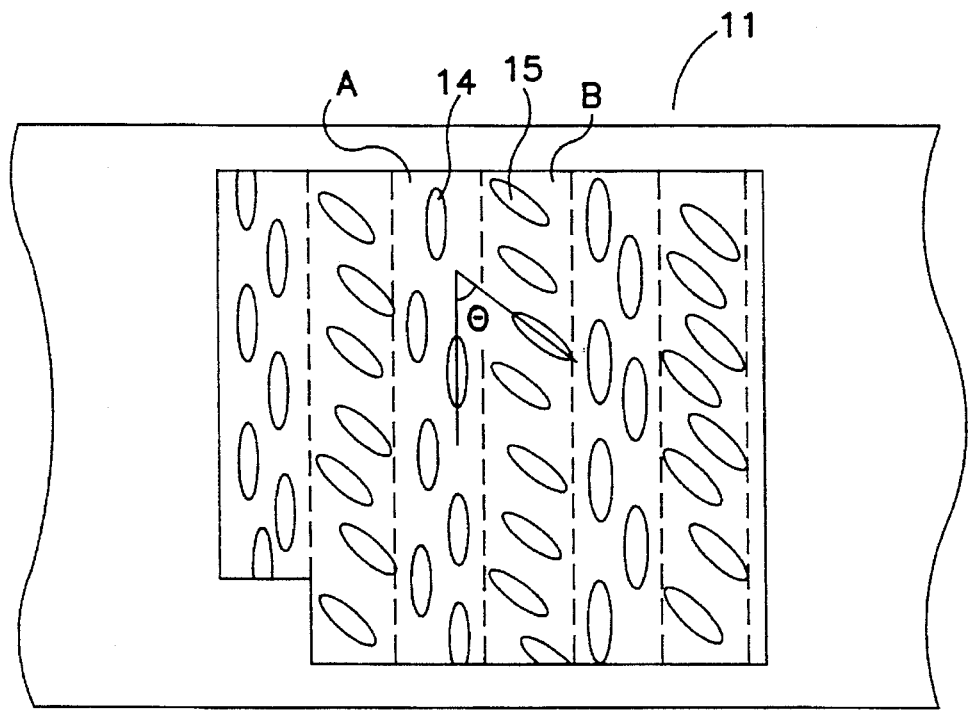
FIG. 1(b) is a plan view of the same.

A first embodiment of a liquid crystal display panel according to the invention is shown in FIGS. 1(a) and 1(b). FIG. 1(a) is a sectional view of the liquid crystal display panel, and FIG. 1(b) is a plan view thereof schematically showing the direction of orientation of liquid crystal molecules in the plane of the substrate of the liquid crystal display panel. In the liquid crystal display panel of the invention, a liquid crystal layer 13 is held between two transparent substrate 11, 12. At the liquid crystal layer sides of the substrates 11, 12, a counter electrode 16 and a pixel electrode 17 are formed as transparent electrodes. The pixel electrode is formed in a matrix, and a thin film transistor (TFT) 18 is disposed near each pixel electrode 17 as a switching element. Each TFT 18 is connected to a source signal wire (not shown) and a gate signal wire (not shown), and respectively connected to a signal feed circuit and a scanning circuit, and a signal voltage is applied to each pixel. A black matrix 19 shields each signal wire and TFT 18.

The liquid crystal layer 13 consists of portions A and B in which the direction of orientation of liquid crystal molecules differ, and they are alternately disposed with a regular periodicity. That is, in the portion A, the molecular long axes of the liquid crystal molecules 14 are oriented in a direction perpendicular to the sheet of paper in a homogeneous state. In the portion B, on the other hand, although in homogeneous state, the molecular long axes are oriented at a certain angle θ to the direction perpendicular to the sheet of paper. More specifically, observing the direction of orientation of liquid crystal molecules 14, 15 of the liquid crystal layer 13 through the transparent substrate in FIG. 1(b), the liquid crystal molecules 15 in portion B are oriented at a certain angle θ relative to the liquid crystal molecules 14 of portion A, as shown in FIG. 12(b). Furthermore, portions A and B are configured as stripes alternately disposed at equal intervals. With such a structure, the liquid crystal display panel of the invention functions as s so-called phase grating, in which portion having different refractive indices provide the periodicity of the grating.

The operation of the liquid crystal display panel of the first embodiment is described below. The incident light 20, of which is natural light, includes light oscillating in a direction perpendicular to the sheet of paper (polarized component 20a) and light oscillating in a direction parallel to the sheet of paper (polarized component 20b). The light 20a oscillating in a direction perpendicular to the sheet of paper passes through the portion A of the liquid crystal layer 13 with a refractive index $n_e$, and passes through the portion B with a refractive index $n_x$ expressed in formula (3). The light 20b oscillating in a direction parallel to the sheet of paper passes through the portion A of the liquid crystal layer 13 with a refractive index no, and passes through the portion B with a refractive index n. expressed in formula (4). As a result, depending on each refractive index difference, the incident light can be modulated at a diffraction efficiency determined in formula (1). The diffracted light is divided from the primary diffracted light as diffracted light of high order at an angle determined in formula (2). On the other hand, when an electric field is applied between electrodes 16 and 17, the liquid crystal molecules 14 in portion A and liquid crystal molecules 15 in portion B are aligned in a direction perpendicular to the substrate and hence, the liquid crystal layer 13 exhibits a uniform monodomain, so that the incident light is not modulated. That is, when a sufficient electric field is applied to the liquid crystal layer 13, the difference in refractive indices between the liquid crystal molecules 14 in portion A and liquid crystal molecules 15 in portion B is nullified, and the incident light is allowed to propagate straight through the panel, and when an electric field is not applied, the incident light is diffracted by an amount corresponding to the difference in refractive indices between the liquid crystal molecules 14 in portion A and liquid crystal molecules 15 in portion B. Therefore, the light diffraction state of the liquid crystal layer of each pixel can be controlled by the applied voltage. Thus, the liquid crystal display panel of the invention can form an optical image by changing the diffraction state in dependence on a video signal. Moreover, it is possible to modulate natural light completely.

Figure 2A:
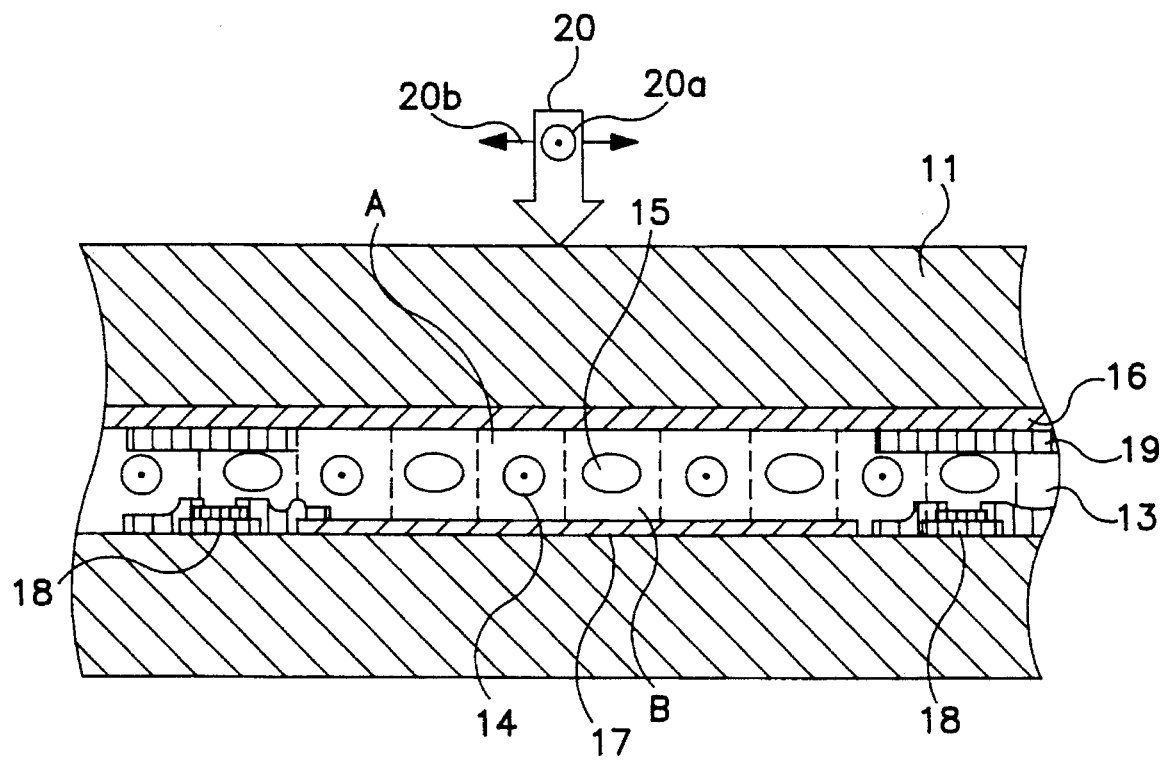
FIG. 2(a) is a sectional view of part of a second embodiment of a liquid crystal display panel according to the present invention.
Figure 2B:
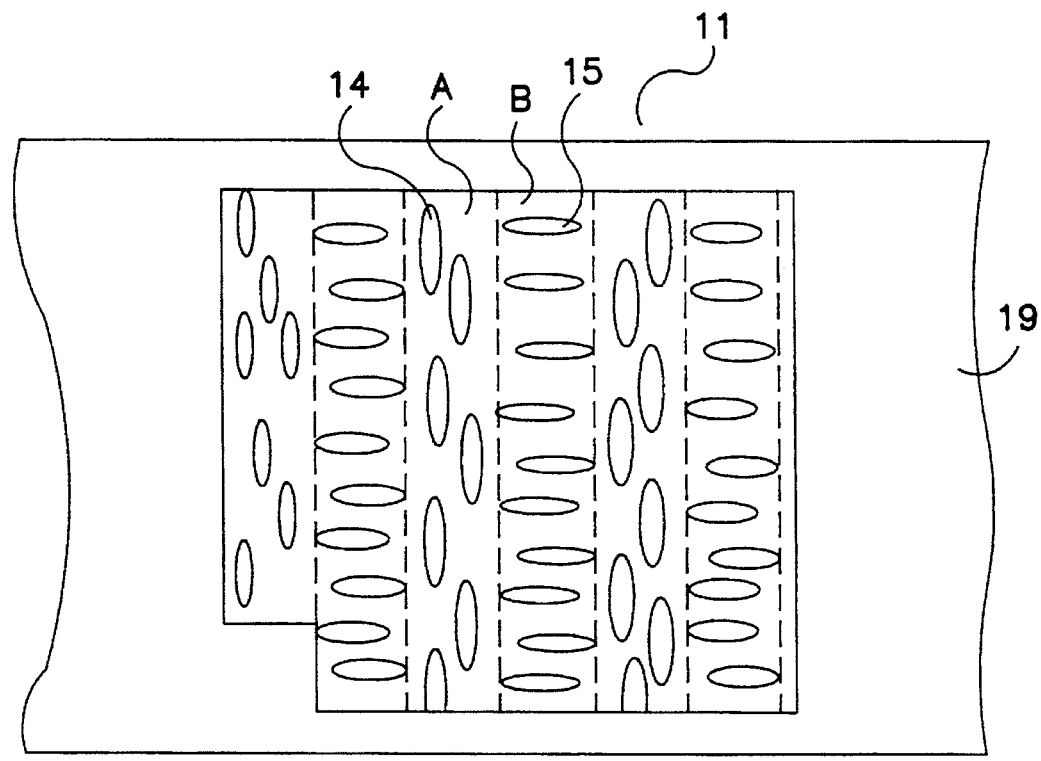
FIG. 2(b) is a plan view of the same.

A second embodiment of a liquid crystal display panel according to the invention is shown in FIGS. 2(a) and 2(b). FIG. 2(a) is a sectional view of the liquid crystal display panel, and FIG. 2(b) is a plan view thereof schematically showing the direction of orientation of liquid crystal in the plane of the substrate of the liquid crystal display panel. To avoid duplicating the preceding description of the first embodiment, only differences between the first and second embodiments will be described below. The same applies to the following embodiments. In this liquid crystal display panel of the invention, the direction of orientation of the liquid crystal molecules 15 in portion B of the liquid crystal layer 13 is parallel to the sheet of paper. This is identical to the first embodiment when the angle θ in the first embodiment is 90°. At this time, the light 20a oscillating in a direction perpendicular to the sheet of paper is transmitted through portion A of the liquid crystal layer with an extraordinary refractive index $n_e$, and through the portion B of the liquid crystal layer with an ordinary refractive index $n_o$. On the other hand, the light 20b oscillating in a direction parallel to the sheet of paper is transmitted through the portion A with an ordinary refractive index $n_o$, and through the portion B with an extraordinary refractive index of $n_e$. Both the light 20a and 20b experience a refractive index difference $\Delta n = n_e - n_o$ and therefore, the light 20 is transmitted by diffracting at an efficiency expressed in formula (1) wherein the refractive index difference $\Delta n = n_e - n_o$. That is, the light is diffracted at the same efficiency regardless of its direction of polarization In this case, i.e. when θ=90°, the largest refractive index difference is obtained, and hence the thickness of the liquid crystal layer can be minimized to attain a desired diffraction efficiency. Further, the driving voltage of the liquid crystal can be lowered. For example, the ordinary refractive index $n_o$ of nematic liquid crystal is about 1.4 to 1.5, and the extraordinary refractive index $n_e$ thereof is in a range of 1.5 to 1.8 when the nematic liquid crystal is cyanobiphenyl, the difference between $n_e$ and $n_o$ is 0.2, which is the greatest difference that can be attained.

A liquid crystal display panel was made using this liquid crystal. The thickness of the liquid crystal layer was about 1.5 μm. Without applying an electric field, the incident light was diffracted, and the straight exit light was set to 0, that is, the diffraction efficiency of 0-th order light was 0. The period of the regions having liquid crystal molecules oriented in directions differing by 90° was about 100 μm, and the diffraction angle of the primary diffracted light was about 0.2° to the normal of the panel. When an electric field was applied to the liquid crystal panel, the diffraction was eliminated, and a transmissivity of about 80% was obtained.

Figure 3:
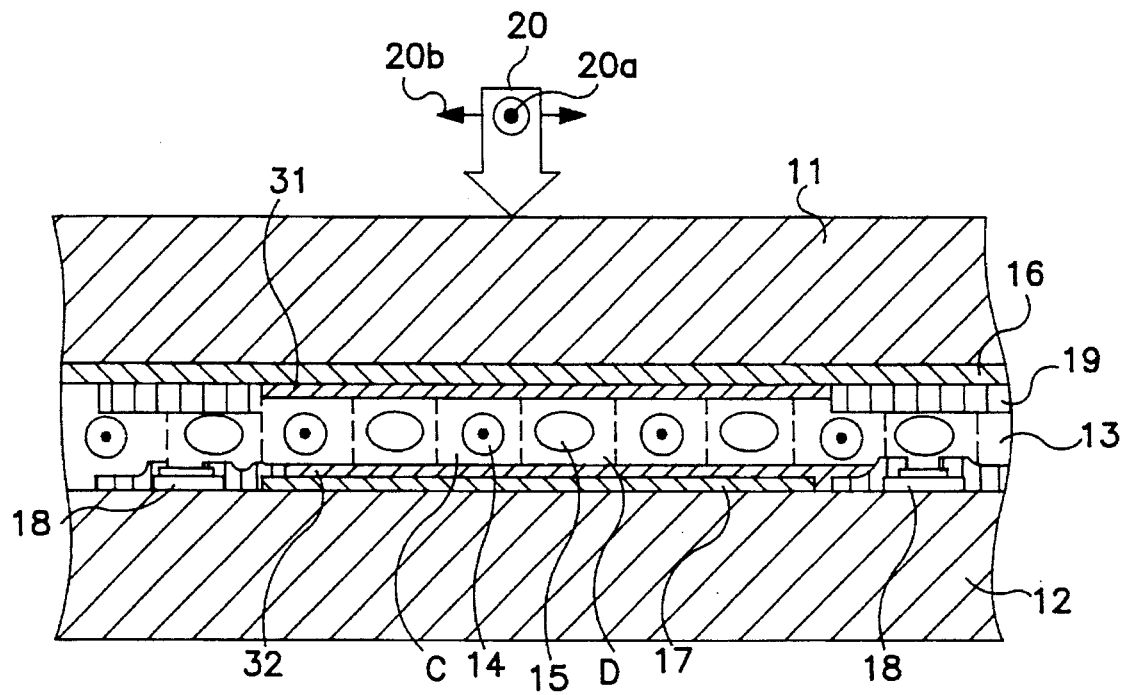
FIG. 3 is a sectional view of part of a third embodiment of a liquid crystal display panel according to the present invention.

A third embodiment of a liquid crystal display panel according to the invention is shown in FIG. 3, which shows a section of the liquid crystal display panel. In this panel, a liquid crystal layer 13 is held between two transparent substrates 11, 12. At the liquid crystal layer sides of the substrate 11, 12, a counter electrode 16 and a pixel electrode 17 are formed as transparent electrodes. Alignment layers 31, 32 for controlling the direction of orientation of liquid crystal are formed on the electrodes 16, 17. However, the orientation of the molecules in portion C and the orientation of the molecules in portion D differ by an angle θ, and these portions are alternately disposed with regular periodicity.

An example of a method of manufacturing the liquid crystal display panels will be described with reference to FIGS. 4(a)–4(g). First, a transparent electrode layer 42 is formed on the surface of a transparent glass substrate 41 as shown in FIGS. 4(a) and 4(b). At this time, signal wires and switching elements may also be formed. An alignment layer 43 is formed on the electrode layer surface of the substrate shown in FIG. 4(b). An ordinary polyimide resin is used as the material of the alignment layer. A polyimide solution dissolved in solvent, or a polyamic acid solution which is a precursor of polyimide is applied on the electrode 42 in an effective display region of the substrate 41 by a printing method or the like, and then baked to form a polyimide resin thin film 43 as shown in FIG. 4(c). A resist film 44 is formed thereon, openings in the form of stripes 1 μm to 10 μm wide are formed at a pitch of 2 μm to 20 μm by developing the resist. As shown in FIG. 4(d), the surface of this substrate is rubbed with a roller 45 wound with cloth or the like in one direction to give a rubbing treatment. The resist film 44 is peeled off, and a new resist film 46 is formed. The portion that was rubbed is now shielded, and the previously shielded portion is now exposed. As shown in FIG. 4(e), the substrate is rubbed again in a different direction by the roller 45. Then, the resist film 46 is peeled off, whereby the substrate to be used in the invention is obtained as shown in FIG. 4(f). Although the resist film was described as used for a mask, it is also possible to mask the film 43 directly with other materials such as metal.

Two of the substrates shown in FIG. 4(f) are used as upper and lower substrates, and the two substrates positioned so that the directions of orientation of their alignment layers (film 43) coincide. A liquid crystal layer 47 is sandwiched between the mutually opposing upper and lower substrates, thereby providing a liquid crystal display panel as shown in FIG. 4(g). The panel operates in the same manner as the first embodiment.

A fourth embodiment of the liquid crystal panel according to the invention will be described with reference to FIG. 5.

Figure 5:
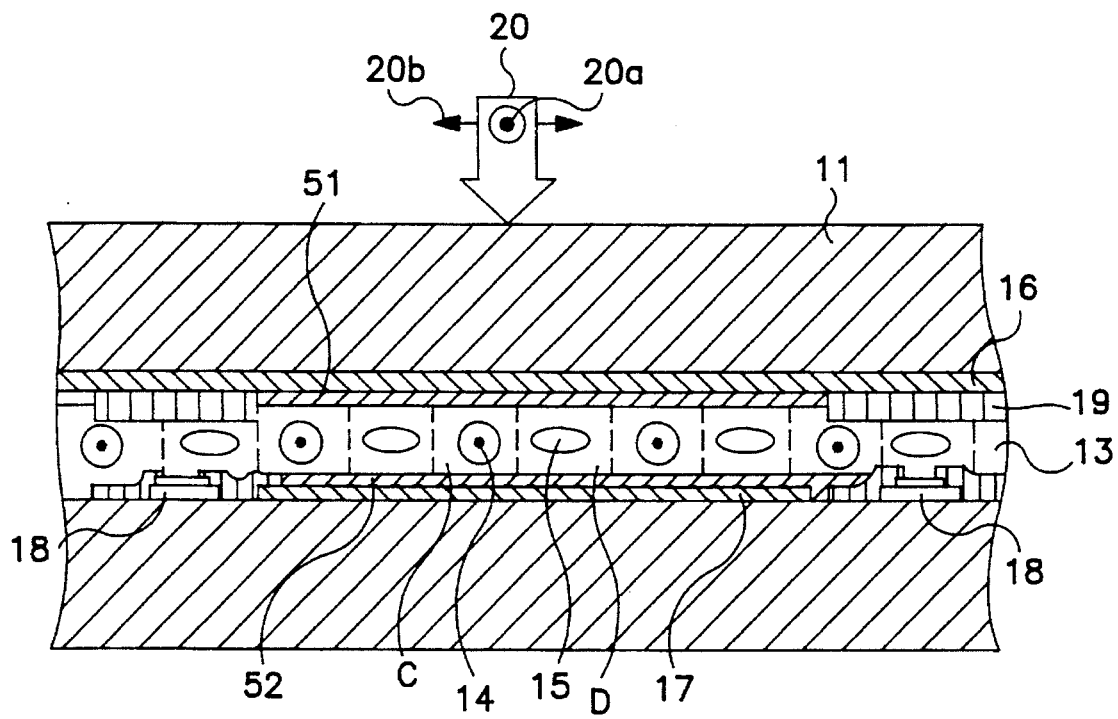
FIG. 5 is a sectional view of a fourth embodiment of a liquid crystal display panel according to the present invention.

FIG. 5 shows a section of the liquid crystal display panel, in which a liquid crystal layer 13 is held between two transparent substrates 11, 12. At the liquid crystal layer sides of the substrates 11, 12, a counter electrode 16 and a pixel electrode 17 are formed as transparent electrodes. Alignment layers 51, 52 for controlling the direction of orientation of liquid crystal are formed on the electrodes 16, 17, respectively. The direction of orientation of the liquid crystal molecules in portions C of the liquid crystal layer 13 and the direction of orientation of the liquid crystal molecules in portions D differ by 90°. The portions C and D are alternately disposed at a specific periodicity. This is achieved by carrying out the steps shown in FIG. 4(e) and FIG. 4(d). The panel operates in the same manner as the second embodiment.

Figure 6:
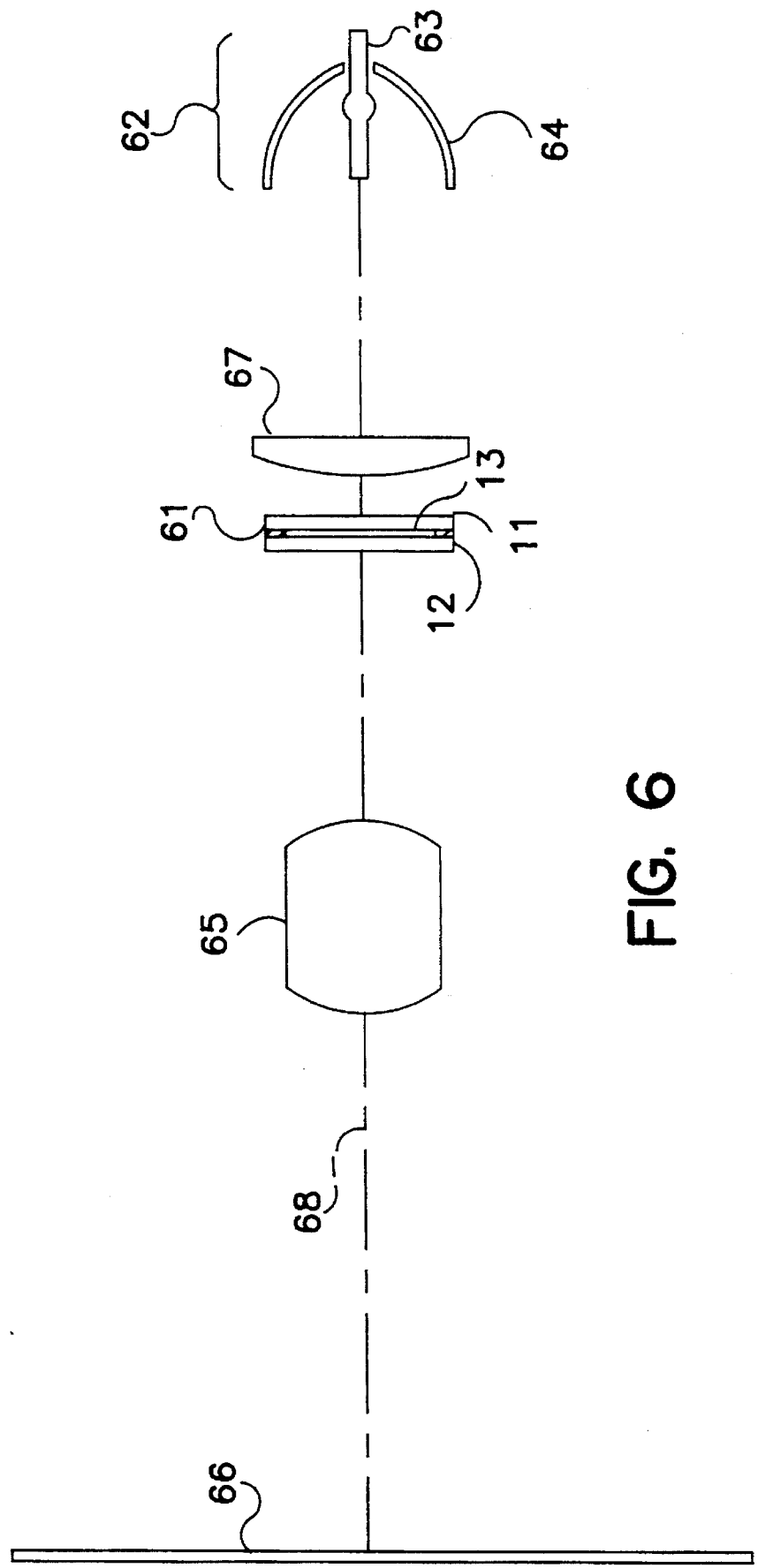
FIG. 6 is a schematic diagram of a first embodiment of a projection display apparatus according to the present invention.

A first embodiment of a projection display apparatus according to the invention is shown in FIG. 6. Numeral 61 denotes a liquid crystal display panel of the invention 62 a light source, 65 a projection lens, and 66 a screen.

The liquid crystal display panel 61 includes a container formed of two glass substrates 11, 12 and a seal member, and a liquid crystal layer 13 injected into the container. In this instance, a liquid crystal display panel of the second embodiment of the invention is used. The molecules of the liquid crystal layer 13 align in the direction of the electric field so that the panel assumes a homeotropic state in which all of the light is transmitted with the same refractive index so as to propagate straight through the panel. When an electric field is not applied, the incident light is diffracted due to differences in the refractive index of the crystal layer 13 created by the different directions of orientation of the molecules of the liquid crystal layer 13. By impressing a voltage across the liquid crystal layer of each pixel, the state of diffraction of light passing therethrough can be controlled. Thus, an optical image can be formed on the liquid crystal panel 61 based on a video signal.

The light source 62 is formed of a lamp 63 and a concave mirror 64. The light leaving the lamp 63 is converged by the concave mirror 64, so that light of a relatively high directivity is emitted. The exit light from the light source 62 passes through a field lens 67 and the liquid crystal panel 61 sequentially, and enters the projection lens 65. The size of the pupil of the projection lens 65 is set so that about 90% of the quantity of light transmitted from the pixels at the center of the liquid crystal display panel 61 are admitted into the pupil. The field lens 67 is used for refracting inwardly the light passing toward the peripheral part of the display region of the liquid crystal panel 61 so that such light will be admitted into the pupil of the projection lens 65, whereby the peripheral area of the projected image will not be dark. The focus of the projected image is adjusted by moving the projection lens 65 along the optical axis 68.

An optical image is formed on the liquid crystal display panel 61 depending on the state of diffraction created by the video signal. The projection lens 65 receives the portion light within a certain solid angle of the light emitted from each pixel. When the state of diffraction of exit light from each pixel varies, the quantity of light within the solid angle is changed, and therefore, the optical image formed on the liquid crystal display panel 61 changes, i.e. changes in the state of diffraction are converted into changes in the illumination of the screen 66. The optical image formed on the liquid crystal display panel 61 is magnified and projected onto the screen 66 by the projection lens 65.

When the projection display apparatus of the invention uses the second embodiment of the liquid crystal display panel, it is possible to modulate even natural light, regardless of the state of polarization of the light entering the liquid crystal display panel 61. Accordingly, the light is transmitted with a high degree of efficiency. Further, regardless of the wavelength of the incident light, the angle of incidence of the light or the temperature, the order of diffraction is 0 when no voltage is applied. That is, the quantity of light transmitted during a "black display" is 0, which contributes to enhancing the contrast of the display image.

As for the liquid crystal display panel 61, the width of the strips of the crystal layer (portions A and portions B in FIGS. 2(a) and 2(b)) is preferred to be 0.5 μm to 20 μm. That is, the period of the grating derived from formula (2) is preferred to be 1 μm to 40 μm. When the stripes are wide, the diffraction angle is narrow, and when the stripes are narrow, the diffraction angle is wide. In particular, in the projection display apparatus in which the liquid crystal display panel of the invention is used as light valve, the light cannot be separated if the diffraction angle is too narrow and the light cannot be picked up by the projection lens if the diffraction angle is too wide.

Figure 7:
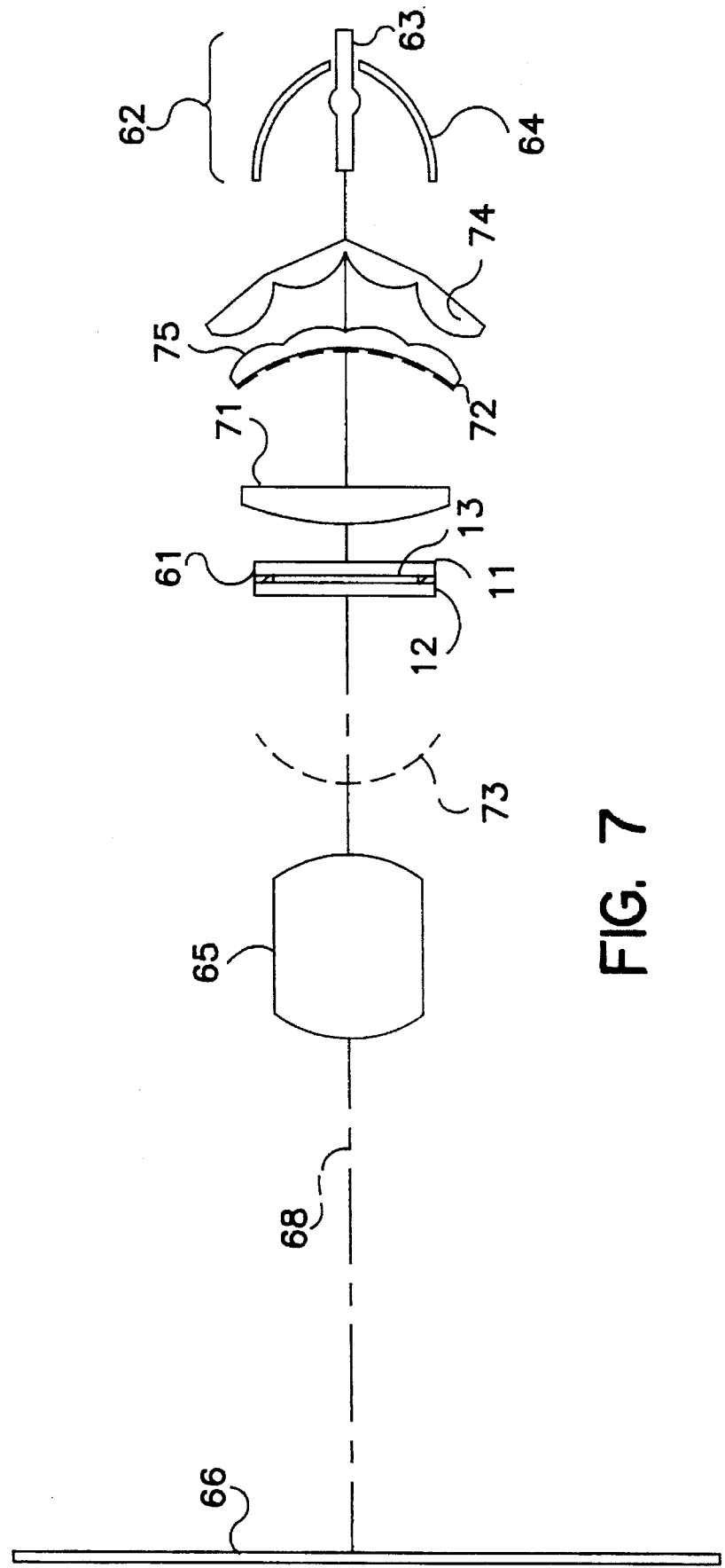
FIG. 7 is a schematic diagram of a second embodiment of a projection display apparatus according to the present invention.

The second embodiment of a projection display apparatus of the invention is shown in FIG. 7. Numeral 61 denotes a liquid crystal display panel, and 62 a light source. The liquid crystal display panel 61 is the same as that shown in FIGS. 2(a) and 2(b).

Moreover, a schlieren lens 71, and an input mask 72 and an output mask 73, serving as schlieren stops, are intended to provide a white display when the liquid crystal display panel 61 is in a diffracting state, and a black display when in a non-diffracting state. In the optical system of the projection display apparatus of the first embodiment, a black display is produced when the liquid crystal display panel 61 is in a diffracting state, and a white display in a non-diffracting state, which is opposite to this embodiment. In the projection display apparatus of the second embodiment, the display is black when an electric field is applied to the liquid crystal display panel 61, so that a black display of high quality is provided stably. The schlieren lens 71 is situated between the input mask 72 and the output mask 73, so as to form a schlieren optical system in which the image at the input mask 72 is focused on the output mask 73. The liquid crystal display panel 61 of the invention is disposed in the schlieren optical system. The light propagating straight through the liquid crystal display panel 61 is shielded by the output mask 73, and only the diffracted light is transmitted through the openings of the output mask 73 onto the screen 66 via the projection lens 65. A fly-eye lens 74 and a field lens array 75 are disposed between the light source 62 and input mask 72. The field lens array 75 is disposed near the input mask 72. The fly-eye lens 74 is used to form the light source image in the openings of the input mask 72, which therefore acts as a miniature light source array. These optical elements enhance the efficiency of the light source. The fly-eye lens 74 and field lens array 75 may, however, be omitted.

Figure 8:
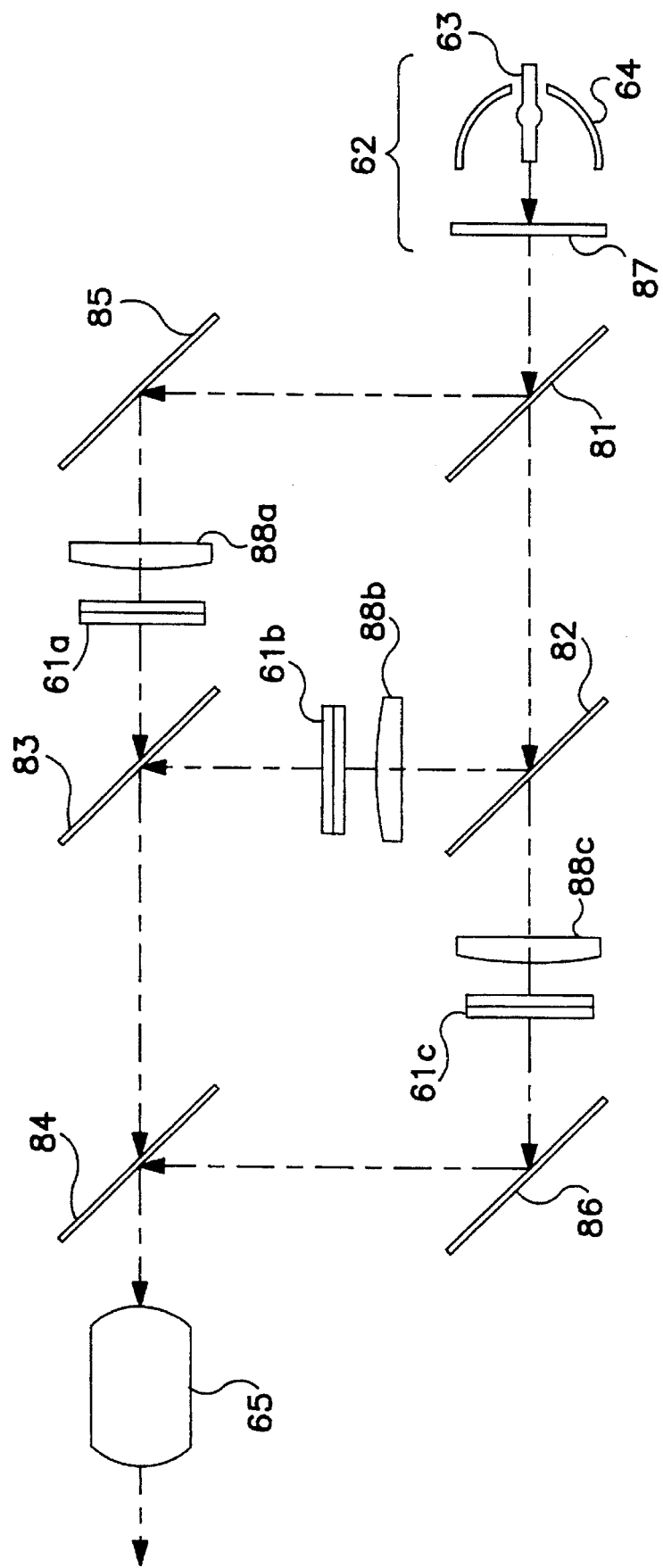
FIG. 8 is a schematic diagram of a third embodiment of a projection display apparatus according to the present invention.

The third embodiment of a liquid crystal projection display apparatus according to the invention is shown in FIG. 8. Numerals 61a, 61b, 61c denote liquid crystal panels, 62 a light source, 65 a projection lens 81, 82, 83, 84 dichroic mirrors, and 85 to 86 planar mirrors.

The liquid crystal display panels 61a, 61b, 61c are each identical to the liquid crystal display panels of the invention shown in FIGS. 2(a) and 2(b).

The light source 62 is formed of a lamp 63, a concave mirror 64, and a filter 87. The lamp 63 is a metal halide lamp, and emits light composed of the three primary colors of red (R), green (G), and blue (B). The concave mirror 64 is made of glass, and a multilayer film (formed thereon by a conventional vapor deposition technique) which reflects visible light and allows infrared light to pass therethrough. The filter 87 comprises a glass substrate, and a multilayer film (also formed by vapor deposition) which allows visible light to pass therethrough and wherein infrared light and ultraviolet light is reflected at the glass substrate. The visible light in the radiation from the lamp 63 is reflected at the reflection panel of the concave mirror 64, so as to propagate close to parallel. The infrared light and ultraviolet light emitted from the concave mirror 64 are removed from the system by the filter 87.

The transmitted light from the light source 62 enters a color separation optical system comprising the dichroic mirrors 81, 82 and the planar mirror 85, and is separated into light of the three primary colors. Each light of a primary color passes through a positive lens 88a, 88b, 88c functioning as a field lens, and enters a liquid crystal display panel 61a, 61b, 61c. The light emitted from the liquid crystal display panels 61a, 61b, 61c is combined by a color synthesis optical system comprising dichroic mirrors 83, 84 and the planar mirror 86, and enters the projection lens 65.

Since the three liquid crystal display panels 61a, 61b, 61c are used for red, green and blue components of the light, respectively, a projection image of excellent brightness and resolution is obtained. At least one of the three liquid crystal display panels 61a, 61b, 61c has a liquid crystal layer of a thickness, refractive index or period that is different from that of the other panels. As is clear from formula (1) and formula (2), the diffraction efficiency and diffraction angle depend on the wavelength of light. Therefore, the liquid crystal layer thickness at which the diffraction efficiency is maximized or the liquid crystal layer thickness at which the diffraction efficiency is nullified should vary slightly among the panels 61a, 61b, 61c. For example, to set the diffraction efficiency of light of the 0-th order to 0 at a refractive index difference an of 0.2, the liquid crystal layer thicknesses of the panels are 1.5 μm, 1.3 μm, and 1.1 μm, respectively. Similarly, the diffraction angle should differ slightly among the panels. For example, when the diffraction angle of first order light is 2°, the pitches of the regions of the liquid crystal layers of the panels should be 12 μm, 10 μm, and 8 μm, respectively.

The dichroic mirror used in the color separation and color synthesis optical system of the invention may be a mere absorption type of color filter. Alternatively, the color synthesis optical system may be omitted in which case three projection lenses are overlaid on the screen.

Figure 9:
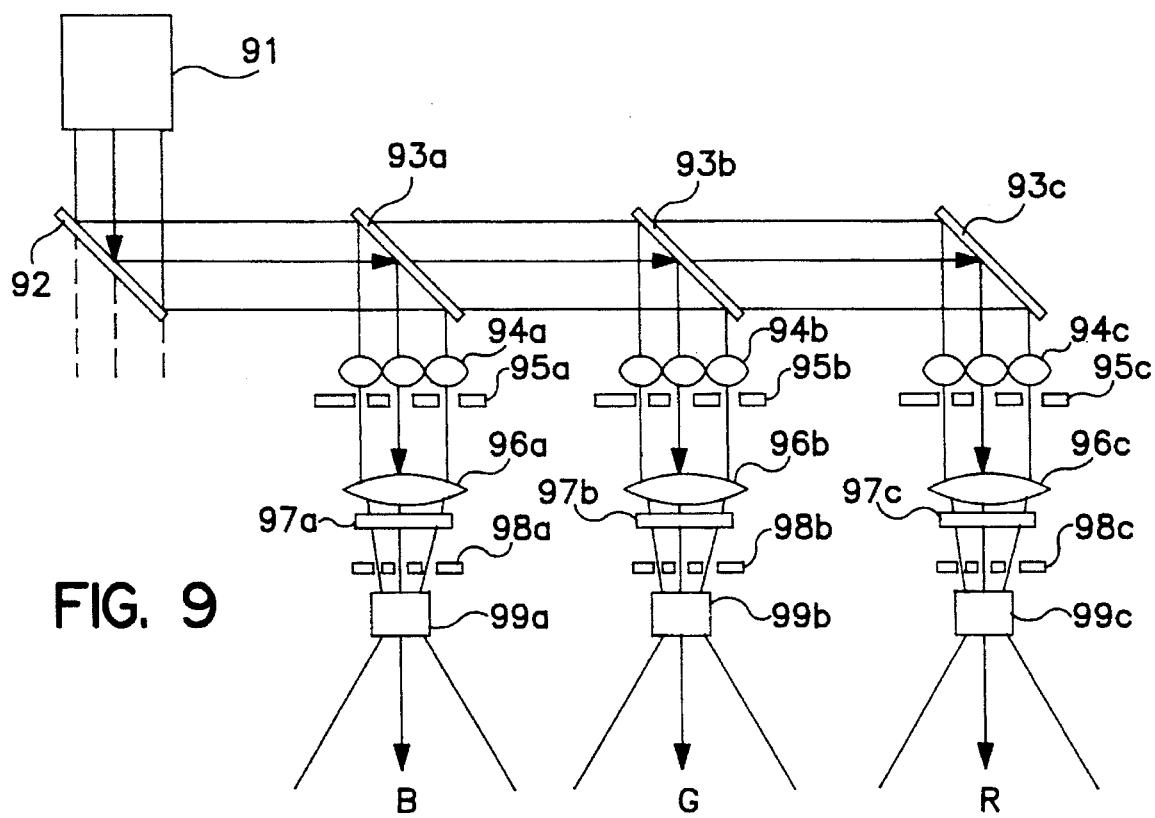
FIG. 9 is a schematic diagram of a fourth embodiment of a projection display apparatus according to the present invention.

An example of a projection display apparatus using three such projection lenses will now be explained. FIG. 9 is a schematic diagram of a fourth embodiment of a projection display apparatus according to the invention. In FIG. 9, numeral 91 denotes a collective optical system having a concave mirror and a metal halide lamp of 250 W as a light source. The concave mirror is designed to reflect only visible light. An ultraviolet ray cut-off filter is disposed at the exit end of the collective optical system 91. Numeral 92 denotes an infrared ray cut-off mirror which allows infrared rays to pass therethrough and reflects only visible light. However, needless to say, the infrared ray cut-off mirror 92 may be incorporated by the collective optical system 91. Meanwhile, reference numeral 93a denotes a blue reflection dichroic mirror (BDM), 93b a green reflection dichroic mirror (GDM), and 93c a red reflection dichroic mirror (RDM). The present invention is not limited to the illustrated sequence of dichroic mirrors. In fact, the final RDM 93c may be replaced by a full reflection mirror.

Numerals 97a, 97b, and 97c denote liquid crystal display panels. Among the liquid crystal display panels, the thickness d of the liquid crystal layer of the liquid crystal display panel 97c for modulating the light R is about 0.2 μm to 1.0 μm greater than the thickness of the liquid crystal layers of the other liquid crystal display panels. This is because the degree of diffraction depends on the wavelength of the light to be modulated. Moreover, if necessary, the thickness of the liquid crystal layer of the liquid crystal panel 97a for modulating blue light is 0.2 μm to 1.0 μm less than that for green light. Numerals 95a, 95b, 95c denote input masks, 98a, 98b, 98c output masks, and 96a, 96b, 96c schlieren lenses. Numerals 94a, 94b and 94c denote fly-eye lenses, and 99a, 99b and 99c projection lenses.

The fly-eye lenses 94a, 94b, 94c and input masks 95a, 95b, 95c may be integrated and disposed between the collective optical system 91 and dichroic mirror 93a. The schlieren lenses 96a, 96b, 96c may be disposed between the liquid crystal display panels 97a, 97b, 97c and output masks 98a, 98b, 98c.

In the projection display apparatus of the invention, the light enters from the confronting substrate side of the liquid crystal display panel, but this is not limitative, and the same effects are obtained if entering from the array substrate side. Thus, the projection display apparatus of the invention does not depend on the input direction of light.

In the projection display apparatus of the third and fourth embodiments, liquid crystal panels for modulating the R, G, and B lights are provided. However, the present invention is not so limited. For example, a mosaic color filter may be attached to one liquid crystal display panel, and light may be transmitted from the pixels of the panel as in the single-panel projection display apparatus of the first and second embodiments.

In the embodiments of the projection display apparatus of FIGS. 6 to 9, the liquid crystal display panel may be replaced with any of the liquid crystal display panels of the embodiments of FIGS. 1, 3, 5, and depending upon the particular application of and restrictions imposed upon the projection display apparatus.

Figure 10:
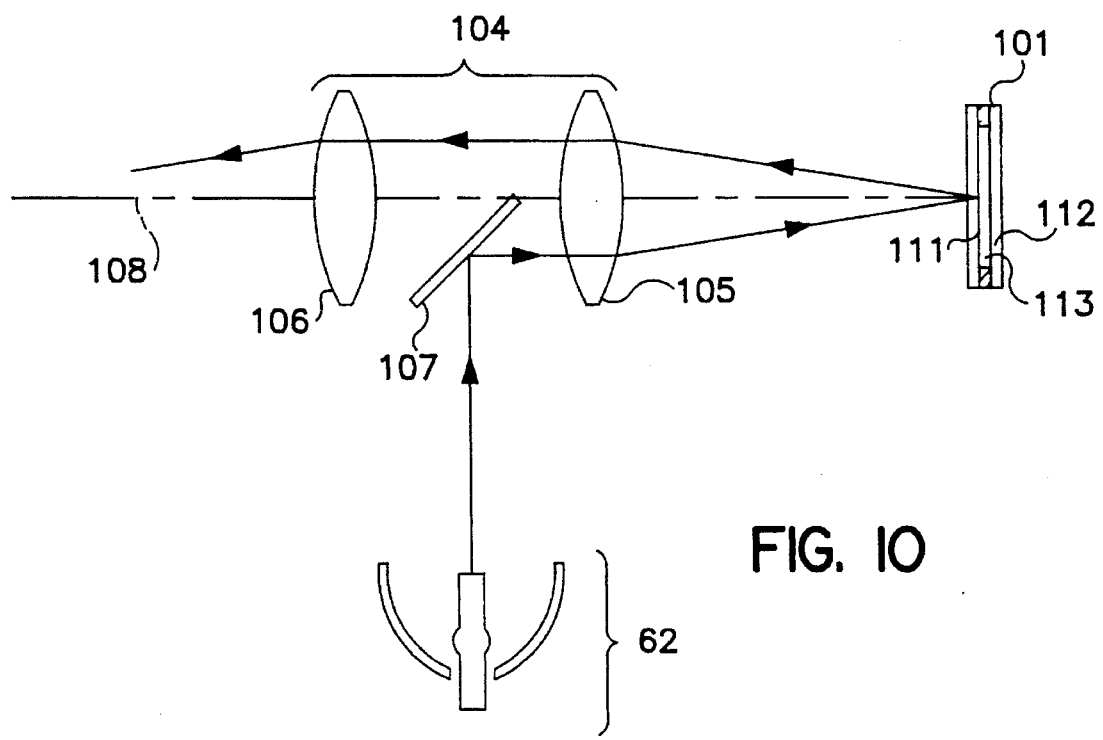
FIG. 10 is a schematic diagram of a fifth embodiment of a projection display apparatus according to the present invention.
Figure 11:
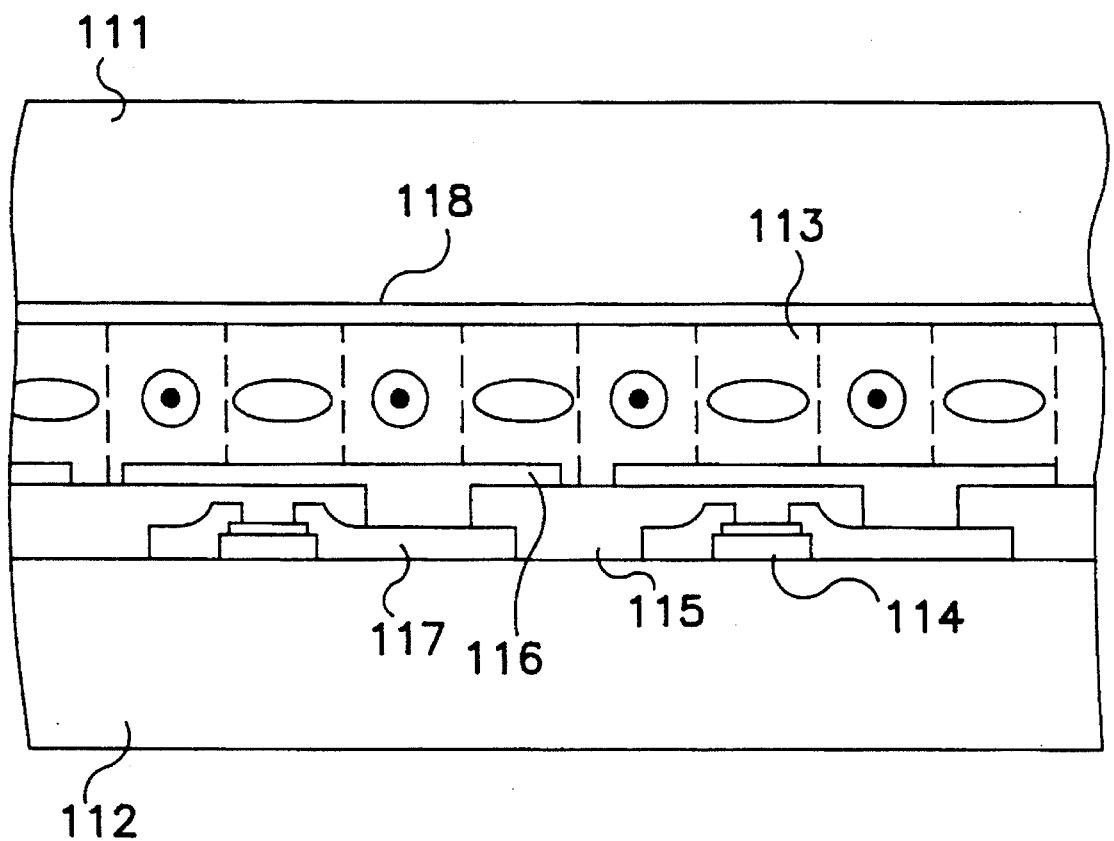
FIG. 11 is an enlarged sectional view of part of the liquid crystal panel used in the projection display apparatus shown in FIG. 10.

The fifth embodiment of a projection display apparatus according to the invention is shown in FIGS. 10 and 11. Numeral 62 denotes a light source, 101 a liquid crystal display panel, and 104 a projection lens. The light source 62 is the same as that shown in FIG. 6.

The liquid crystal display panel 101 is a reflection type of liquid crystal display panel. The liquid crystal display panel 101 includes an enclosed space formed by a first glass substrate 112, a second glass substrate 111, and a seal member, and a liquid crystal layer 113 injected into the space. As shown in FIG. 22, a TFT 114 is formed in a matrix on the first glass substrate, and a pixel electrode 116 of aluminum is formed thereon through an intervening insulation layer 115. Each pixel electrode 116 is connected to a drain electrode 117 of each TFT 114. A common electrode 118 comprising a transparent conductive film is formed on the second glass substrate 111. In the liquid crystal layer 113, as shown in FIG. 2, the direction of orientation of liquid crystal of adjacent regions differs by 90°, which regions are defined with a specific period.

A projection lens member 104 comprises a first lens group 105 closer to the liquid crystal panel 101, and a second lens group 106 closer to the screen, and a planar mirror 107 is disposed between the first lens group 105 and the second lens group 106. The scattered light emitted from the pixel located in the center of the liquid crystal panel 101 passes through the first lens group 105, and about half of that enters the planar mirror 107, while the remainder thereof does not enter the planar mirror 107 but enters the second lens group 106. The normal reflection plane of the planar mirror 107 is inclined 45° to the optical axis 103 of the projection lens 104. The light from the light source 62 is reflected by the plane mirror 107, passes through the first lens group 105, and enters the liquid crystal display panel 101. The light reflected from the liquid crystal display panel 101 passes sequentially through the first lens group 105 and second lens group 106 and reaches the screen. The light from the center of the diaphragm of the projection lens 104 and propagating toward the liquid crystal display panel 101 is designed to enter the liquid crystal layer 113 almost vertically, that is, to be telocentric.

In the projection display apparatus using the diffraction type of liquid crystal panel, to improve the contrast of the projected image, the diffraction efficiency of 0-th order light must be as small as possible, preferably close to 0. From formula (1), if the depth d of the grating is constant, the refractive index difference an of the liquid crystal layer should be as large as possible. In existing liquid crystal layers, however, the maximum extraordinary refractive index is 1.7 to 1.8, and hence $\Delta n = n_e - n_o$ is about 0.2. At this refractive index difference, therefore, to obtain a diffraction efficiency for light of the 0-th order at 0, the thickness of the liquid crystal layer must be 2 µm. In a reflection type of liquid crystal display, the light passes through the liquid crystal layer twice. Therefore, the thickness of the liquid crystal layer may be about half that of the transmission type of liquid crystal display panel. Accordingly, the contrast of the projected image is more enhanced in a reflection type of liquid display panel than in the transmission type. That is, by reducing the thickness of the liquid crystal layer, a projected image of low voltage drive and excellent contrast is obtained.

What is claimed is:

1. A projection display apparatus comprising;

a light source;

at least one liquid crystal display panel comprising a first substrate and a second substrate, at least one said substrates being light-transmissive, a respective electrode layer disposed on each of the substrates, the electrode layers confronting each other, and a liquid crystal layer of liquid crystal molecules interposed between the first and the second substrates, the liquid crystal layer having a first side facing said first substrate and a second side facing said second substrate, the liquid crystal layer defining a plurality of first regions and a plurality of second regions each extending from the first side of the liquid crystal layer to the second side of the liquid crystal layer, each of said second regions being located between two adjacent ones of said first regions and spaced from one another with a regular periodicity, all of the liquid crystal molecules in said first regions being oriented in the same first direction such that all of the liquid crystal molecules that are located between the electrode layers within said first regions are in a homogeneous state of alignment, and all of the liquid crystal molecules in said second regions being oriented in the same second direction, the second direction being different from said first direction, such that all the liquid crystal molecules that are located between the electrode layers within said second regions are in a homogeneous state of alignment;

a first optical part interposed between said light source and said liquid crystal display panel along the optical axis of the apparatus so as to light from said light source to the liquid crystal display panel;

a second optical part disposed downstream from said liquid crystal display panel along the optical axis of the apparatus so as to receive light from the liquid crystal display panel and project the received light; and a color filter separating light generated by the light source into blue light, green light, and red light, and wherein said at least one liquid crystal display panel comprises liquid crystal display panels optically associated with each of the blue, green and red lights, respectively, and the width of each of the regions of at least one of the liquid crystal display panels is different from width of each of the regions of the other liquid crystal display panels.

2. A projection display apparatus comprising;

a light source;

at least one liquid crystal display panel comprising a first substrate add a second substrate, at least one of said substrates being light-transmissive, a respective electrode layer disposed on each of the substrates, the electrode layers confronting each other, a respective alignment layer disposed on each said electrode layer, and a liquid crystal layer of liquid crystal molecules interposed between the first and the second substrates, the liquid crystal layer having a first side facing said first substrate and a second side facing said second substrate, the liquid crystal layer defining a plurality of first regions and a plurality of second regions each extending from the first side the liquid crystal layer to the second side of the liquid crystal layer, each of said second regions being located between two adjacent ones of said first regions and spaced from one another with a regular periodicity, all of the liquid crystal molecules in said first regions being oriented in the same first direction such that all of the liquid crystal molecules that are located between the electrode layers within said first regions are in a homogeneous state of alignment, and all of the liquid crystal molecules in said second regions being oriented in the same second direction, the second direction being different from said first direction, such that all of the liquid crystal molecules that are located between the electrode layers within said second regions are in a homogeneous state of alignment;

a first optical part interposed between said light source and said liquid crystal display panel along the optical axis of the apparatus so as to lead light from said light source to the liquid crystal display panel;

a second optical part disposed downstream from said liquid crystal display panel along the optical axis of the apparatus so as to receive light from the liquid crystal display panel and project the received light; and a color filter separating light generated by the light source into blue light, green light, and red light, and wherein said at least one liquid crystal display panel comprises liquid crystal display panels optically associated with each of the blue, green and red lights, respectively, and the width of each of the regions of at least one of the liquid crystal display panels is different from width of each of the regions of the other liquid crystal display panels.

3. A liquid crystal display panel comprising:

a first substrate and a second substrate, at least one of said substrates being light-transmissive;

a respective electrode layer disposed on each of the substrates, the electrode layers confronting each other; and a liquid crystal layer that is continuous layer of liquid crystal molecules interposed between the first and the second substrates, the liquid crystal layer having a first side facing said first substrate and a second side facing said second substrate, the liquid crystal layer defining a plurality of first regions and a plurality of second regions each extending from the first side of the liquid crystal layer to the second side of the liquid crystal layer, each of said second regions being located between two adjacent ones of said first regions and spaced from one another with a regular periodicity, all of the liquid crystal molecules in said first regions being oriented in the same first direction such that all of the liquid crystal molecules that are located between the electrode layers within said first regions are in a homogeneous state of alignment, and all of the liquid crystal molecules in said second regions being oriented in the same second direction, the second direction being different from said first direction, such that all of the liquid crystal molecules that are located between the electrode layers within said second regions are in a homogeneous state of alignment.

4. A liquid crystal display panel of claim 3, wherein the second direction in which the liquid crystal molecules in said second regions are oriented extends at 90° to the first direction in which the liquid crystal molecules in said first regions are oriented.

5. A liquid crystal display panel as claimed in claim 3, wherein all of the liquid crystal molecules have their long axes lying parallel to said substrates.

6. A liquid crystal display panel comprising:

a first substrate and a second substrate, at least one of said substrates being light-transmissive;

a respective electrode layer disposed on each of the substrates, the electrode layers confronting each other;

a respective alignment layer disposed on each said electrode layer; and a liquid crystal layer that is a continuous layer of liquid crystal molecules interposed between the first and the second substrates, the liquid crystal layer having a first side facing said first substrate and a second side facing said second substrate, the liquid crystal layer defining a plurality of first regions and a plurality of second regions each extending from the first side of the liquid crystal layer to the second side of the liquid crystal layer, each of said second regions being located between two adjacent ones of said first regions and spaced from one another with a regular periodicity, all of the liquid crystal molecules in said first regions being oriented in the same first direction such that all of the liquid crystal molecules that are located between the electrode layers within said first regions are in a homogeneous state of alignment, and all of the liquid crystal molecules in said second regions being oriented in the same second direction, the second direction being different from said first direction, such that all of the liquid crystal molecules that are located between the electrode layers within said second-regions are in a homogeneous state of alignment.

7. A liquid crystal display panel of claim 6, wherein the second direction in Which the liquid crystal molecules in said regions are oriented extends at 90° to the first direction in which the liquid crystal molecules in said first regions are oriented.

8. A liquid crystal display panel as claimed in claim 6, wherein all of the liquid crystal molecules have their long axes lying parallel to said substrates.

9. A projection display apparatus comprising:

a light source;

at least one liquid crystal display panel comprising a first substrate and a second substrate, at least one said substrates being light-transmissive, a respective electrode layer disposed on each of the substrates, the electrode layers confronting each other, and a liquid crystal layer that is a continuous layer of liquid crystal molecules interposed between the first and the second substrates, the liquid crystal layer having a first side facing said first substrate and a second side facing said second substrate, the liquid crystal layer defining a plurality of first regions and a plurality of second regions each extending from the first side of the liquid crystal layer to the second side of the liquid crystal layer, each of said second regions being located between two adjacent ones of said first regions and spaced from one another with a regular periodicity, all of the liquid crystal molecules in said first regions being oriented in the same first direction such that all of the liquid crystal molecules that are located between the electrode layers within said first regions are in a homogeneous state of alignment, and all of the liquid crystal molecules in said second regions being oriented in the same second direction, the second direction being different from said first direction, such that all of the liquid crystal molecules that are located between the electrode layers within said second regions are in a homogeneous state of alignment;

a first optical part interposed between said light source and said liquid crystal display panel along the optical axis of the apparatus so as to lead light from said light source to the liquid crystal display panel; and a second optical part disposed downstream from said liquid crystal display panel along the optical axis of the apparatus so as to receive light from the liquid crystal display panel and project the received light.

10. A projection display apparatus of claim 9, and further comprising a first mask interposed between the liquid crystal display panel and the light source along said optical axis, a second mask interposed between the liquid crystal panel and the second optical part along said optical axis, and a schlieren lens interposed between the first mask and the second mask along said optical axis such that an image at the first mask is formed on the second mask.

11. A projection display apparatus of claim 10, and further comprising a fly-eye lens interposed between the light source and the first mask along said optical axis so that an image at the fly-eye lens is formed on the first mask.

12. A projection display apparatus of claim 9, and further comprising a color filter separating light generated by the light source into blue light, green light, and red light, and wherein said at least one liquid crystal display panel comprises liquid crystal display panels optically associated with each of the blue, green and red lights, respectively, and the thickness of the liquid crystal layer of at least one of the liquid crystal display panels is different from the thickness of the liquid crystal layer of the other liquid crystal display panels.

13. A projection display apparatus as claimed in claim 9, wherein all of the liquid crystal molecules have their long axes lying parallel to said substrates.

14. A projection display apparatus of claim 9, wherein width of each of the regions is 1 μm to 40 μm.

15. A liquid crystal display panel of claim 9, wherein the second direction in which the liquid crystal molecules in said regions are oriented extends at 90° to the first direction in which the liquid crystal molecules in said first regions are oriented.

16. A projection display apparatus comprising
   a light source;
   at least one liquid crystal display panel comprising a first substrate and a second substrate, at least one of said substrates being light-transmissive, a respective electrode layer disposed on each of the substrates, the electrode layers confronting each other, a respective alignment layer disposed on each said electrode layer, and a liquid crystal layer that is a continuous layer of liquid crystal molecules interposed between the first and the second substrates, the liquid crystal layer having a first side facing said first substrate and a second side facing said second substrate, the liquid crystal layer defining a plurality of first regions and a plurality of second regions each extending from the first side of the liquid crystal layer to the second side of the liquid crystal layer, each of said second regions being located between two adjacent ones or said first regions and spaced from one another with a regular periodicity, all of the liquid crystal molecules in said first regions being oriented in the same first direction such that all of the liquid crystal molecules that are located between the electrode layers within said first regions are in a homogeneous state of alignment, and all of the liquid crystal molecules in said second regions being oriented in the same second direction, the second direction being different from said first direction, such that all of the liquid crystal molecules that are located between the electrode layers within said second regions are in a homogeneous state of alignment;
   a first optical part interposed between said light source and said liquid crystal display panel along the optical axis of the apparatus so as to lead light from said light source to the liquid crystal display panel; and
   a second optical part disposed downstream from said liquid crystal display panel along the optical axis of the apparatus so as to receive light from the liquid crystal display panel and project the received light.

17. A projection display apparatus of claim 16, and further comprising a first mask interposed between the liquid crystal display panel and the light source along said optical axis, a second mask interposed between the liquid crystal panel and the second optical part along said optical axis, and a schlieren lens interposed between the first mask and the second mask along said optical axis such that an image at the first mask is formed on the second mask.

18. A projection display apparatus of claim 17, and further comprising a fly-eye lens interposed between the light source and the first mask along said optical axis so that an image at the fly-eye lens is formed on the first mask.

19. A projection display apparatus of claim 16, and further comprising a color filter separating light generated by the light source into blue light, green light, and red light, and wherein said at least one liquid crystal display panel comprises liquid crystal display panels optically associated with each of the blue, green and red lights, respectively, and the thickness of the liquid crystal layer of at least one of the liquid crystal display panels id different from the thickness of the liquid crystal layer of the other liquid crystal display panels.

20. A projection display apparatus as claimed in claim 16, wherein all of the liquid crystal molecules have their long axes lying parallel to said substrates.

21. A projection display apparatus of claim 16, wherein width of each of the regions is 1 μm to 40 μm.

22. A liquid crystal display panel of claim 16, wherein the second direction in which the liquid crystal molecules in said regions are oriented extends at 90° to the first direction in which the liquid crystal molecules in said first regions are oriented.

23. A method of manufacturing a liquid crystal display panel, said method comprising: forming an electrode layer on each of two substrates, at least one of which is light-transmissive, forming an alignment layer on each of the electrode layers, rubbing each of the alignment layers in a first direction over a first striped region thereof comprising a plurality of first spaced apart stripes and rubbing each of the alignment layers in a second direction different from the first direction over a second striped region of the alignment layer comprising a plurality of second spaced apart stripes alternately disposed with said first stripes to develop charges in the alignment layers, spacing the two substrates across from one another in positions in which the alignment layers confront each other and the directions in which one of the alignment layers was rubbed are lined up with the directions in which the other of the alignment layers was rubbed so that the charges in the alignment layers are aligned with one another across the space between the substrates, and injecting liquid crystal between the two spaced apart substrates.

24. A method of manufacturing a liquid crystal display panel of claim 23, wherein the second direction extends at 90° to the first direction.

* * * * *